(12) United States Patent
De Carufel

(10) Patent No.: US 9,902,409 B2
(45) Date of Patent: Feb. 27, 2018

(54) TORQUE WRENCH ADAPTOR SYSTEM FOR A RAILCAR HAND BRAKE

(71) Applicant: Normand De Carufel, Boucherville (CA)

(72) Inventor: Normand De Carufel, Boucherville (CA)

( * ) Notice: Subject to any disclaimer, the term of this patent is extended or adjusted under 35 U.S.C. 154(b) by 613 days.

(21) Appl. No.: 14/503,770

(22) Filed: Oct. 1, 2014

(65) Prior Publication Data

US 2015/0114673 A1    Apr. 30, 2015

(51) Int. Cl.
| | |
|---|---|
| *B25B 13/06* | (2006.01) |
| *B61H 13/02* | (2006.01) |
| *B25B 13/50* | (2006.01) |
| *B60T 7/10* | (2006.01) |
| *B25B 21/00* | (2006.01) |
| *B23B 31/02* | (2006.01) |
| *B25B 13/48* | (2006.01) |

(52) U.S. Cl.
CPC ............. *B61H 13/02* (2013.01); *B25B 13/06* (2013.01); *B25B 13/50* (2013.01); *B60T 7/10* (2013.01); *B23B 31/02* (2013.01); *B25B 13/48* (2013.01); *B25B 21/002* (2013.01)

(58) Field of Classification Search
CPC ......... B25B 13/02; B25B 13/06; B25B 13/48; B25B 13/481; B25B 13/463; B25B 13/50; B25B 21/002; B25B 17/02; B61H 13/00; B61H 13/02; B23B 31/02; B23B 2231/04; B23B 2231/06; Y10T 279/17008; Y10T 279/3406

USPC ..... 173/29, 213, 216, 131, 170, 171, 31, 32; 81/464, 176.1, 176.2, 177.1, 121.1, 124.2, 81/124.4, 57.31, 177.2, 57.44, 176.15; 279/14, 143; 251/90, 93, 291, 293
See application file for complete search history.

(56) References Cited

U.S. PATENT DOCUMENTS

| | | | | | |
|---|---|---|---|---|---|
| 2,814,221 | A | * | 11/1957 | Preslan | .................. B25B 27/30 81/484 |
| 3,734,515 | A | * | 5/1973 | Dudek | ................ B25B 23/0035 173/29 |
| 3,835,736 | A | * | 9/1974 | Campbell, Jr. | ......... B25B 13/58 251/93 |
| 3,889,558 | A | * | 6/1975 | Duncan | ................. B25B 13/488 81/55 |
| 3,946,984 | A | * | 3/1976 | Sutter | .................... F16K 31/05 251/129.03 |
| 4,070,931 | A | * | 1/1978 | Florko, Jr. | .............. B25B 13/06 81/121.1 |
| 4,095,494 | A | * | 6/1978 | Castoe | .................. B25B 13/463 81/176.2 |
| 4,334,443 | A | * | 6/1982 | Pearson | ................. B25B 13/48 81/55 |
| 4,429,855 | A | * | 2/1984 | Buffone | .................. F16K 27/07 137/556 |

(Continued)

*Primary Examiner* — Scott A. Smith
(74) *Attorney, Agent, or Firm* — Benoit & Cote, Inc.; C. Marc Benoit

(57) ABSTRACT

The present document describes a torque wrench adaptor system for applying a torque value to an operating shaft of a manual brake of a railcar. The torque wrench adaptor system comprises: a central hub for a hand wheel, the central hub attachable to the operating shaft via the central hub; and a socket adaptor removably engageable in the central hub, and adapted for engagement with a ratchet tool; wherein the ratchet tool is for applying torque which is transmitted to the operating shaft via the socket adaptor and central hub until the torque value is reached and applied to the operating shaft.

13 Claims, 19 Drawing Sheets

(56) References Cited

U.S. PATENT DOCUMENTS

| | | | | | |
|---|---|---|---|---|---|
| 4,573,378 | A | * | 3/1986 | McDonald | B25B 27/02 294/211 |
| 4,714,233 | A | * | 12/1987 | Oates | E21B 34/02 137/72 |
| 4,885,962 | A | * | 12/1989 | Summers | B25B 17/02 81/176.2 |
| 4,991,469 | A | * | 2/1991 | Pella | B25B 13/48 81/176.1 |
| 5,203,240 | A | * | 4/1993 | Sorter | B25B 13/02 81/124.2 |
| 5,511,286 | A | * | 4/1996 | Williams | B25B 13/48 16/422 |
| 5,799,545 | A | * | 9/1998 | George | B61H 13/02 475/317 |
| 6,269,717 | B1 | * | 8/2001 | Bollinger | B25B 13/06 81/124.4 |
| 6,282,989 | B1 | * | 9/2001 | Sorter | B25B 13/48 81/124.2 |
| 6,951,156 | B2 | * | 10/2005 | Garg | B25B 13/06 81/121.1 |
| 7,354,230 | B2 | * | 4/2008 | Bauman | B23B 31/008 279/143 |
| 8,302,708 | B1 | * | 11/2012 | Cox | E21B 17/03 175/300 |
| 2009/0229421 | A1 | * | 9/2009 | Bass | B25B 13/481 81/57 |
| 2012/0204684 | A1 | * | 8/2012 | Monroe | B25B 13/50 81/177.1 |
| 2013/0233121 | A1 | * | 9/2013 | Monroe | G05G 1/04 74/557 |

\* cited by examiner

TORQUE WRENCH ADAPTOR SYSTEM FOR A RAILCAR HAND BRAKE

CROSS-REFERENCE TO RELATED APPLICATIONS

This application claims priority of UK patent application GB 1,319,135.8, filed on Oct. 30, 2013, the specification of which is hereby incorporated by reference.

BACKGROUND (a) Field

The subject matter disclosed generally relates to brakes and, more particularly, to a torque wrench adaptor system for a railcar hand brake assembly, and a method of using the same.

(b) Related Prior Art

Manual hand brake assemblies on conventional railcars such as, for example, platform type railcars, tank railcars, hopper railcars, as well as passenger railcars, are well known in the art. These manual hand brake assemblies are usable for applying the brakes on a railcar, or series of railcars, for safety measures during, for example, prolonged stationary operations of a railway convoy, maintenance on a train engine or a section of rails, or the likes.

Such manual brake assemblies are generally operable through a hand wheel generally found at one distal end of each railcar. To properly apply the manual brakes on the wheels of a railcar, an operator must rotate the hand wheel typically clockwise until a predetermined torque force is reached.

But, as is often the case, human error occurring typically during a particular series of odd events may eventually result in a hand wheel not being properly rotated to the predetermined torque value such that, in the end, a railcar, or a series of railcars starts to roll down a hill unattended and cause immeasurably grave accidents including loss of life.

For example, the torque on a brake hand wheel may not be properly set because an operator may be in a hurry to finish a work shift, is tired with soared muscles prior to applying the manual brakes, or simply neglects to set the proper torque since there are no feedback or measurable reference except the strain felt in his or her arms.

Furthermore, significant fatigue accumulation in the arms of the operator sequentially applying the hand brakes on, for example, a series of twenty railcars, or more, may not necessarily end up applying the same torque value on the last railcar, compared to the first car in the series. As well, there may be differences in the torque value applied, or at least the perception of the torque value applied by two different persons on a same hand brake assembly.

Furthermore, if a ratchet tool is used having a dial indicating the torque applied on the nut securing the hand wheel on its operating shaft, there exists a risk of altering the tightening of the hand wheel nut thereon. In such a case, the accumulation of such operations using a ratchet tool may inadvertently loosen the nut to a point where the hand wheel may fall off the railcar during travel, thus causing a hazard which, in turn, may also cause a railway accident.

Therefore, there is a need for an improved system for reliably applying a predetermined torque value on the hand wheel of a manual brake system of a railcar without risking to alter the tightening of the nut securing the hand wheel of the brake assembly.

SUMMARY

According to an embodiment, there is provided a torque wrench adaptor system for applying a torque value to an operating shaft of a manual brake of a railcar. The torque wrench adaptor system comprising: a central hub for a hand wheel, the central hub attachable to the operating shaft via the central hub; and a socket adaptor removably engageable in the central hub, and adapted for engagement with a ratchet tool; wherein the ratchet tool is for applying torque which is transmitted to the operating shaft via the socket adaptor and central hub until the torque value is reached and applied to the operating shaft.

According to an aspect, the socket adaptor comprises a first end and a bore at the first end, the bore adapted for engagement with an output drive of a torque multiplicator tool which in turn is adapted for engagement to the a ratchet tool.

According to an aspect, the socket adaptor comprises a second end, the second end being distal the first end, and a cylindrical portion at the second end, and further wherein the central hub comprises a central hub which defines a socket engaging bore extending axially inwardly relative to the central hub and which defines a substantially cylindrically shaped socket bore inner surface adapted for engagement with the cylindrical portion of the socket adaptor.

According to an aspect, the substantially cylindrically shaped socket bore inner surface is provided with socket bore parallel grooves extending thereon longitudinally.

According to an aspect, the cylindrical portion at the second end of the socket defines a plurality of socket longitudinal ridges that are for corresponding engagement with the socket bore parallel grooves of the socket engaging bore.

According to an aspect, the socket adaptor has a substantially cylindrical shape defining the first end and the second end.

According to an aspect, the first end is provided with a square socket bore extending longitudinally inwardly toward the second end, the square socket bore being for engaging therein an output drive square of the torque multiplicator tool.

According to an aspect, the second end defines a socket outer cylindrical portion for slidably engaging in the socket engaging bore of the central hub.

According to an aspect, the second end is provided with a socket rounded bore extending longitudinally inwardly toward the first end.

According to an aspect, the central hub is secured on the operating shaft by a hand wheel nut engaged on a threaded distal end of the operating shaft, the socket rounded bore being large enough for wholly encompassing the hand wheel nut thereby avoiding altering the tightening of the hand wheel nut securing the central hub on the operating shaft thereof.

According to an aspect, the system further comprises a torque multiplicator abutment member for attachment on the railcar proximal a circumference of the hand wheel and a torque multiplicator extension member for abutting on the torque multiplicator abutment member when the torque is applied to the ratchet tool thereby selectively retaining an elongated handle of the torque multiplicator tool at a fixed angle while the ratchet tool is used to more precisely apply the torque value.

According to an aspect, the torque multiplicator abutment member provides an abutment member prong portion extending substantially perpendicularly distally from the railcar.

According to an aspect, the torque multiplicator extension member has a substantially L-shaped configuration.

According to an aspect, the torque multiplicator extension member has a distal end provided with a handle engaging socket member for removable attachment with the torque multiplicator tool.

According to an aspect, the central hub and the socket adaptor are made of a substantially rigid metal.

According to another embodiment, there is provided a method for applying a torque value to an operating shaft of a manual brake system of a railcar. The method comprises: engaging a second end of a socket adaptor into a socket engaging bore at a center of a front end of a central hub for a hand wheel installed on the operating shaft; engaging an output drive square of a torque multiplicator tool into a first end of the socket adaptor; engaging an output drive square of a ratchet tool into the torque multiplicator tool; and using the ratchet tool to apply torque which is transmitted to the operating shaft via the socket adaptor and the central hub until the torque value is reached and applied to the operating shaft.

According to an aspect, using the ratchet tool to apply torque comprises retaining an elongated handle of the torque multiplicator tool at a fixed angle while the ratchet tool is used to more precisely apply the torque value.

According to an aspect, the method further comprises installing a torque multiplicator extension member on the elongated handle of the wherein the torque multiplicator tool, and wherein the torque multiplicator extension member is used in the retaining of the elongated handle of the torque multiplicator tool at a fixed angle.

According to an aspect, the retaining of the elongated handle of the torque multiplicator tool at a fixed angle comprising abutting an torque multiplicator abutment member against a torque multiplicator abutment member attached on the railcar proximal a circumference of the hand wheel thereby retaining an elongated handle of the torque multiplicator tool at a fixed angle while the ratchet tool is used to more precisely apply the torque value.

As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
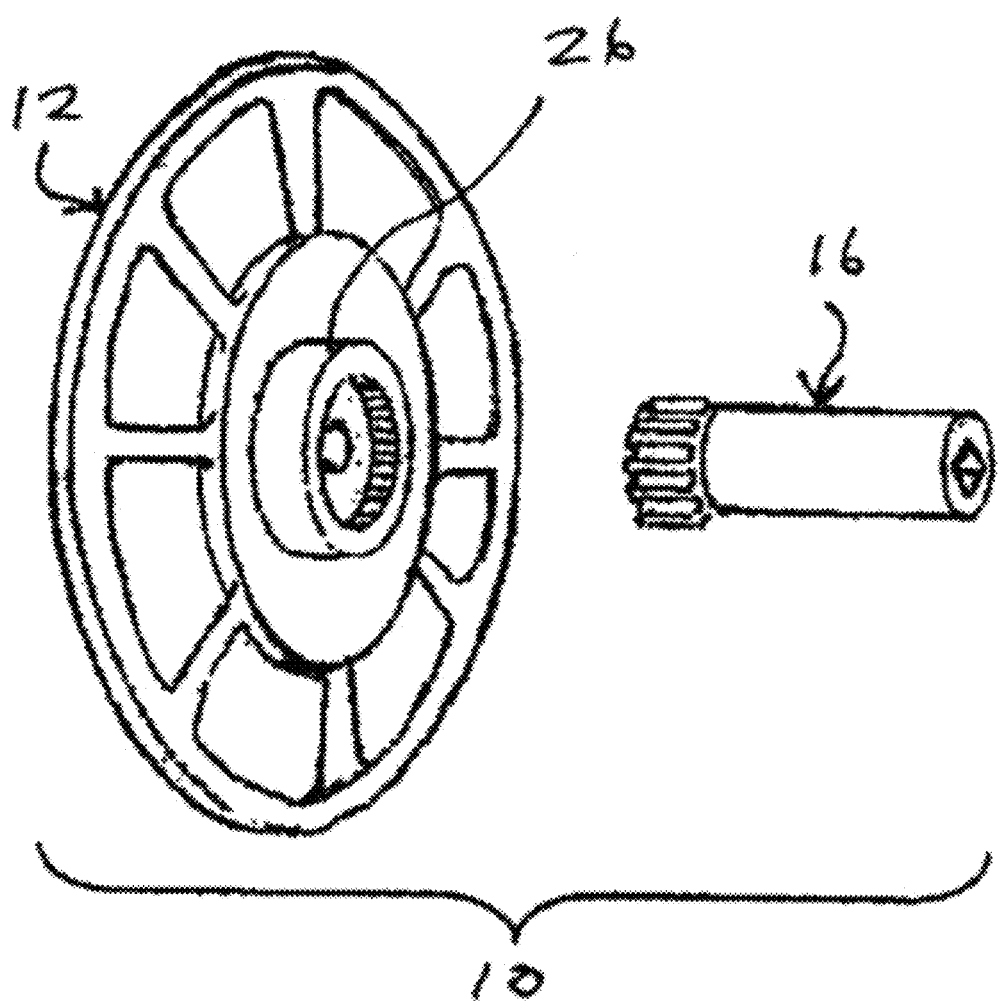
FIG. 1 is a perspective exploded view illustrating an embodiment of a torque wrench adaptor system for a railcar hand brake assembly.
Figure 2:
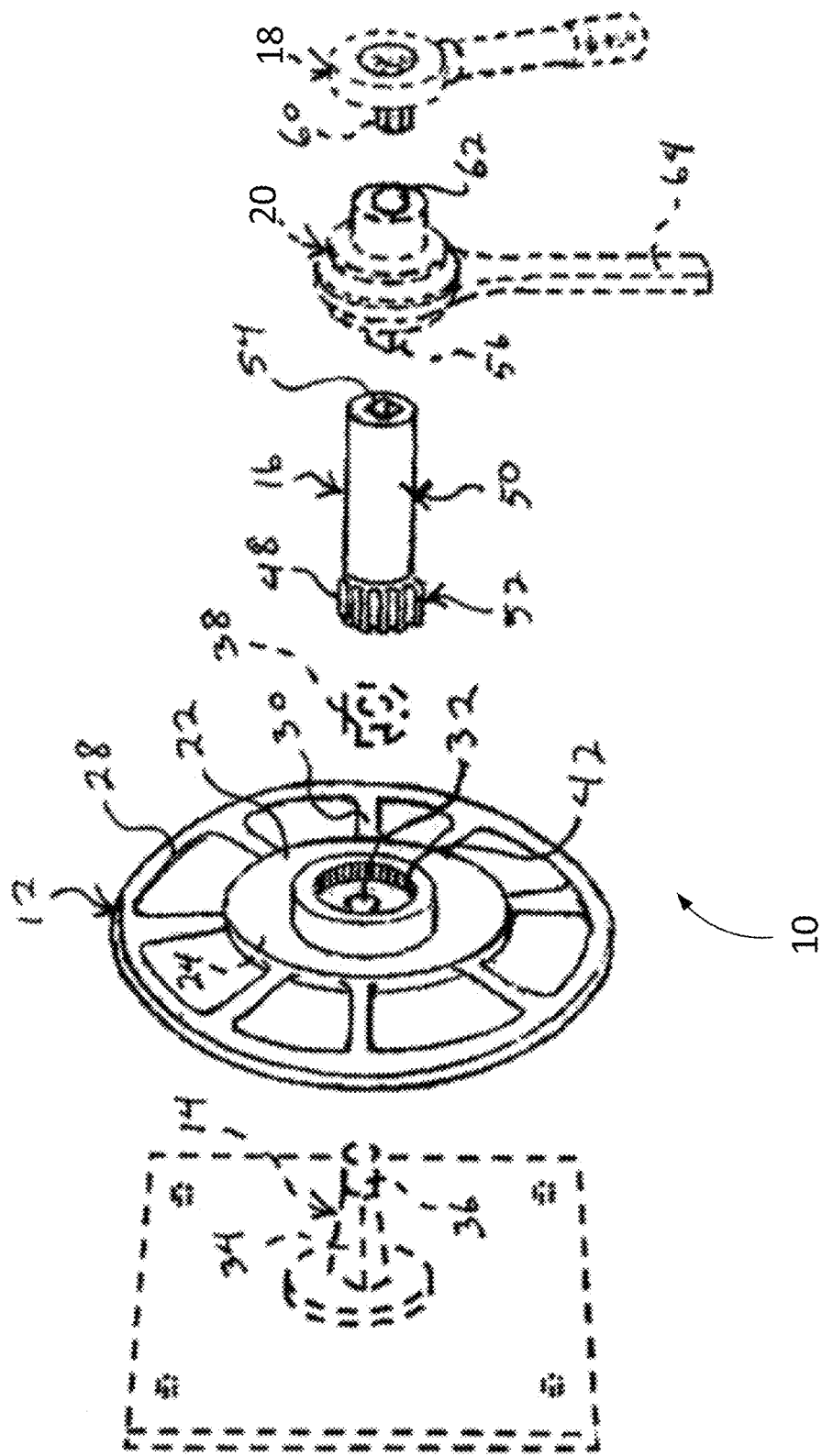
FIG. 2 is an environmental perspective exploded view illustrating the torque wrench adaptor system of FIG. 1.
Figure 3:
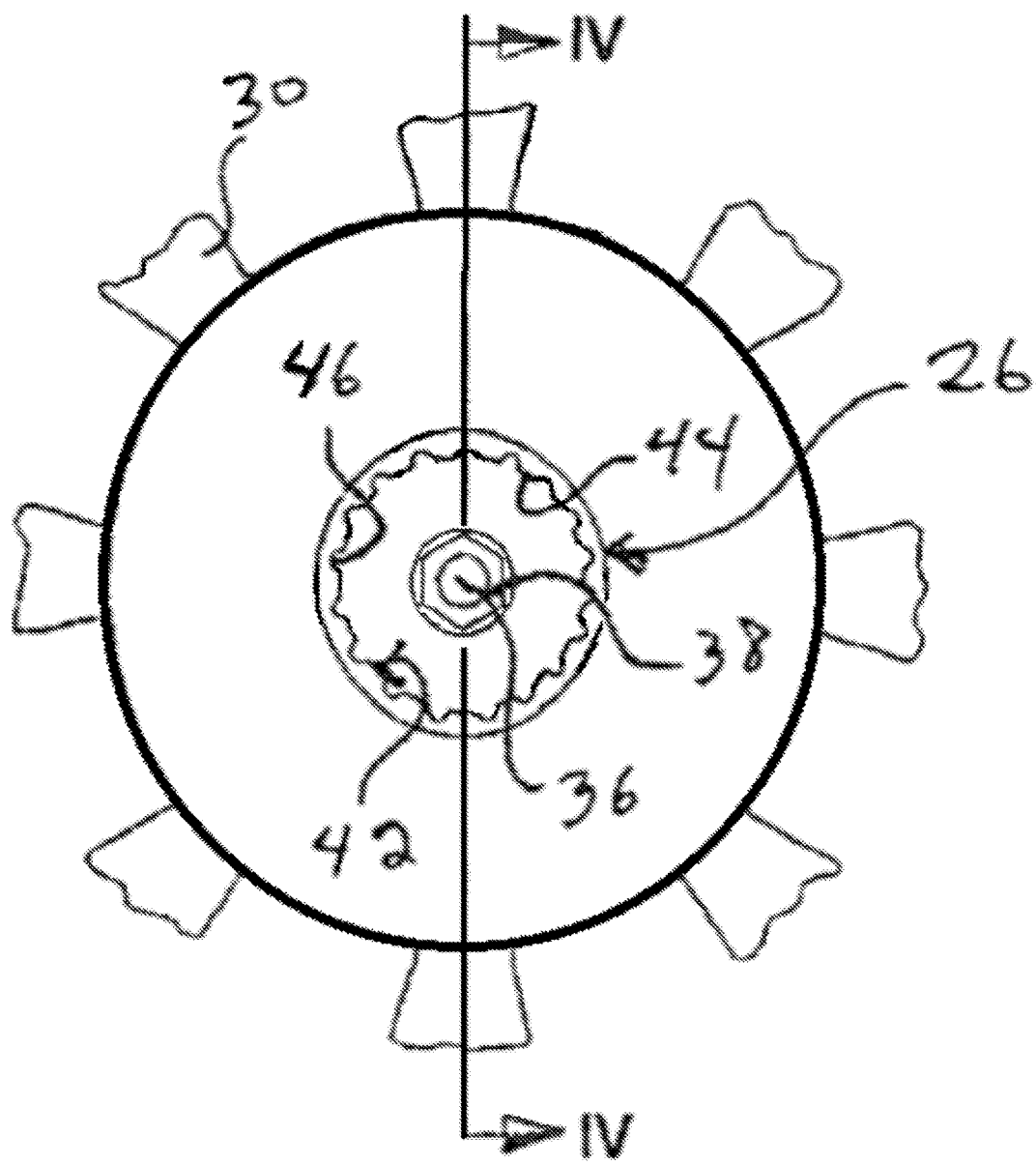
FIG. 3 is a partial front view illustrating a hand wheel attachable to a railcar hand brake assembly, according to an embodiment.

In a broad aspect and referring to FIGS. 1 and 2, the present invention provides a torque wrench adaptor system 10 usable for more precisely applying a predetermined torque value on the hand wheel 12 of a manual brake system of a railcar without altering the tightening of the nut securing the hand wheel 12 on the operating shaft 14 thereof.

According to an embodiment, the torque wrench adaptor system 10 generally comprises a hand wheel 12 attachable to a conventional operating shaft 14 of a railcar manual brake assembly, and a socket adaptor 16 (also known as a spline) removably engageable in a central hub 26 of the hand wheel 12.

The torque wrench adaptor system 10 is typically usable in cooperative relation with a conventional torque multiplicator tool 20 and a conventional ratchet tool 18. More particularly, additionally to its internal torque multiplication mechanism, the torque multiplicator tool 20 also integrates a torque limiting mechanism that effectively limits the torque value that may be applied therewith.

The hand wheel 12 is substantially similar to a conventional hand wheel that is typically found attached on the operating shaft 14 of a railcar hand brake assembly. The central hub 26 of the hand wheel 12 further defines a socket engaging bore 42. The socket engaging bore 42 extends axially inwardly relative to the hand wheel front end 22 and defines a substantially cylindrically shaped socket bore inner surface 44.

The socket bore inner surface 44 defines a series of socket bore parallel splines or grooves 46 that are radially distributed and extending longitudinally inwardly relative to the distal end thereof.

The socket adaptor 16 has a substantially cylindrical shape defining a socket adaptor first end 50 and a socket adaptor second end 52. The socket adaptor first end 50 is provided with a standard size square socket bore 54 extending longitudinally inwardly relative to the distal end thereof. The square socket bore 54 is typically sized and configured for engaging the output drive square 56 of the torque multiplicator tool 20.

The socket adaptor second end 52 defines a socket outer cylindrical portion that is compatibly shaped an sized for slidably engaging, in a snug fit relation the socket engaging bore 42 at the center of the hand wheel front end 22. More particularly, the socket outer cylindrical portion defines a plurality of socket longitudinal ridges 48 that are corresponding number, size and configuration relative to the radially distributed and longitudinally extending socket bore parallel grooves 46 of the socket engaging bore 42.

Furthermore, the socket adaptor second end 52 is provided with a socket rounded bore 58 extending longitudinally inwardly relative to the distal end thereof. The socket rounded bore 58 is suitably shaped and sized for freely encompassing the whole outer dimensions of the hand wheel nut 38 threadedly engaged on the operating shaft threaded distal end 36 for securing the hand wheel 12 thereon.

The hand wheel 12 and socket adaptor 16 are preferably made of a substantially rigid metal conventionally used in the manufacture of rail cars (such as the manufacture of hand wheels) for operating machinery and socket tools respectively.

Thus, by engaging the socket adaptor second end 52 into the socket engaging bore 42 at the center of the hand wheel front end 22, followed with engaging the output drive square 56 of the torque multiplicator tool 20 into the standard size square socket bore 54 of the socket adaptor first end 50 and, finally, by engaging the output drive square 60 of the ratchet tool 18 into the standard input square bore 62 of the torque multiplicator tool 20, an operator may reliably properly apply a predetermined torque force on the hand wheel 12 of a railcar manual brake assembly without altering the tightening of the nut securing the hand wheel 12.

In an alternate embodiment of a torque wrench adaptor system 10, according to the present invention, the presently described embodiment is substantially similar to the first embodiment described above with the exception that it further includes a torque multiplicator abutment member 70 and a torque multiplicator extension member 72.

The torque multiplicator abutment member 70 is attachable to a railcar wall portion substantially proximal the hand wheel 12 of the railcar manual brake assembly. The torque multiplicator abutment member 70 is characterized in that it provides an abutment member prong portion 80 extending perpendicularly distally from the railcar wall portion.

The torque multiplicator extension member 72 has a substantially L-shaped configuration, with one distal end provided with a handle engaging socket member 82 that is removably attachable to the handle, or reaction arm 64, of a torque multiplicator tool 20.

Thus, the torque multiplicator abutment member 70, in cooperative relation with the torque multiplicator extension member 72, may be used to provide a convenient abutment means for the handle of the torque multiplicator tool 20 while the operator applies a torque force on the ratchet tool 18.

FIGS. 1 to 7 and 15 to 21 show various aspects of an embodiment of a torque wrench adaptor system 10.

Referring to FIGS. 1 and 2, the torque wrench adaptor system 10 generally includes a hand wheel 12 attachable to a conventional operating shaft 14 of a railcar hand brake assembly, and a socket adaptor 16 removably engageable in a central hub 26 of the hand wheel 12.

As illustrated in FIG. 2, the torque wrench adaptor system 10 is typically usable in cooperative relation with a conventional ratchet tool 18 and a torque multiplicator tool 20. More particularly, additionally to its internal torque multiplication mechanism, the torque multiplicator tool 20 also integrates a torque limiting mechanism that effectively limits the torque value that may be applied. For example, in some brands of a torque multiplicator tool 20 integrating such a torque limiting mechanism, an indication that the maximum torque value is reached may be typically signaled to the operator through a distinctive 'click' that is generated by the torque multiplicator tool 20 once the value has been reached. Other signals, such as a light signal (e.g. emitted by a LED), or a "bip" sound, or other sounds, can be used to indicate that the desired value is reached. And once this distinctive 'click' is generated, the input square bore 62 of the torque multiplicator tool 20 becomes freely rotatable relative to its output drive square 56 such that no more torque force may be applied through the torque multiplicator tool 20 with the ratchet tool 18.

Furthermore, present as well as custom torque limit value and/or torque multiplicator ratio are commercially available for the corresponding tools used in cooperative relation with the present invention. For example, a typical torque limit value may be between 150 and 200 foot-pounds. Other torque limit values are also possible, depending on the brand or manufacturer of the railcars. According to an embodiment, the torque multiplicator tool 20 only works for one torque value and needs to be changed if the torque value to be applied changes due to an update in the regulations, for example.

It is to be noted that in some other brands of a torque multiplicator tool 20 also integrating such a torque limiting mechanism, an indication that the maximum torque value is reached may be signaled to the operator through a graduated scale on the head of the tool.

Furthermore, it is to be understood that there are other equivalent ratchet, torque multiplicator and torque limiting tools and mechanisms, either in a combined form or fully separate elements, are readily available on the market. For example, the torque limiting mechanism may be integrated with the ratchet tool 18 instead of the torque multiplicator tool 20. Furthermore, as is well known in the art, the ratchet tool 18 may be replaced with a hydraulic, pneumatic or electric power ratchet tool 18.

Figure 13:
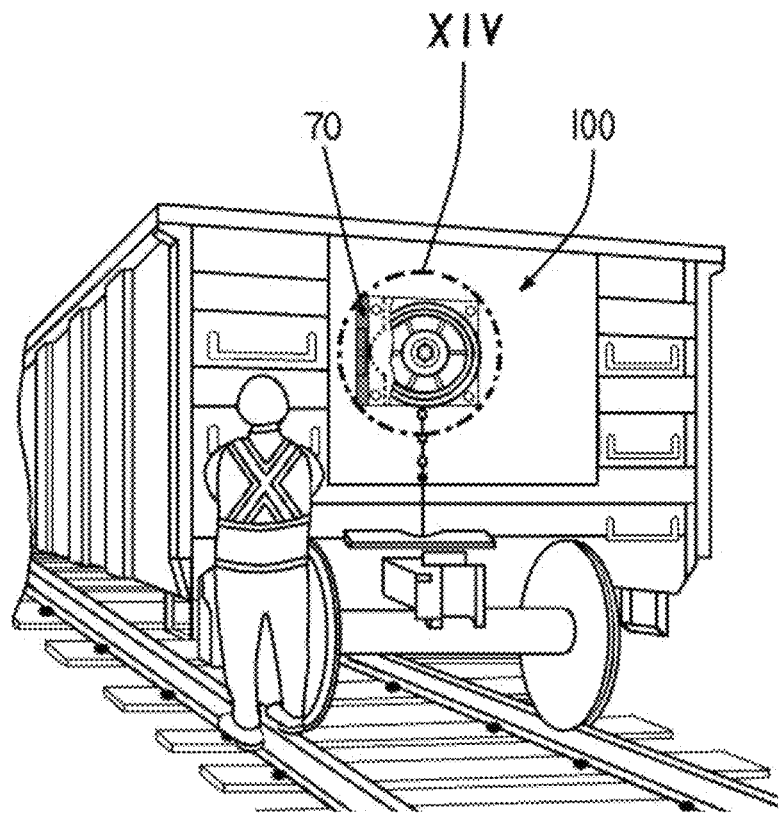
FIG. 13 is an environmental perspective view illustrating the torque multiplicator abutment member of FIG. 10 here shown installed proximal a railcar hand brake assembly on a railcar.

Now referring to FIGS. 2, 3, 4 and 15, the hand wheel 12 is substantially similar to a hand wheel 12 typically found attached on an operating shaft 14 of a railcar hand brake assembly. The hand wheel 12 is typically circular and generally defines a hand wheel front end 22 and a hand wheel rear end 24 that is oppositely facing the distal end of the railcar, as best illustrated in FIG. 13.

Typically, by turning clockwise or counter clockwise the hand wheel 12, and thus the operating shaft 14, the hand brake of the railcar is applied or released correspondingly.

The hand wheel 12 further defines a central hub 26 and an outer rounded peripheral edge 28 integrally formed with, or otherwise attached to, the central hub 26 through radially extending spokes 30 or an equivalent structure as is commonly found on such type of hand wheel 12.

The central hub 26 defines a hub central bore 32 extending through axially thereof. The hub central bore 32 further defines an inner longitudinal configuration that is suitably shaped and sized for engaging in a radially locked relation a shaft proximal end portion 34 of the operating shaft 14.

Typically, the shaft proximal end portion 34 of a conventional operating shaft 14 has an outwardly tapering portion defining of quadrilateral transverse cross-sectional configuration and is terminated with an operating shaft threaded distal end 36 for threadedly engaging thereon a hand wheel nut 38. It is to be understood that the operating shaft 14 of the railcar hand brake assembly, and the compatibly shaped hub central bore 32 of the hand wheel 12, may both have any other compatible shapes, configurations and relative sizes that may suite a particular standard in the railway car industry.

Correspondingly, the hub central bore 32 defines an inner bore tapering portion 40 extending inwardly relative to the hand wheel rear end 24, and terminates in a socket engaging bore 42 having a diameter suitably sized for freely engaging the shaft threaded distal end 36.

The central hub 26 further defines a socket engaging bore 42. The socket engaging bore 42 extends axially inwardly relative to the hand wheel front end 22 and defines a substantially cylindrically shaped socket bore inner surface 44.

The socket bore inner surface 44 defines a series of socket bore 54 parallel splines or grooves 46 radially distributed and extending longitudinally inwardly relative to the distal end thereof.

Figure 4:
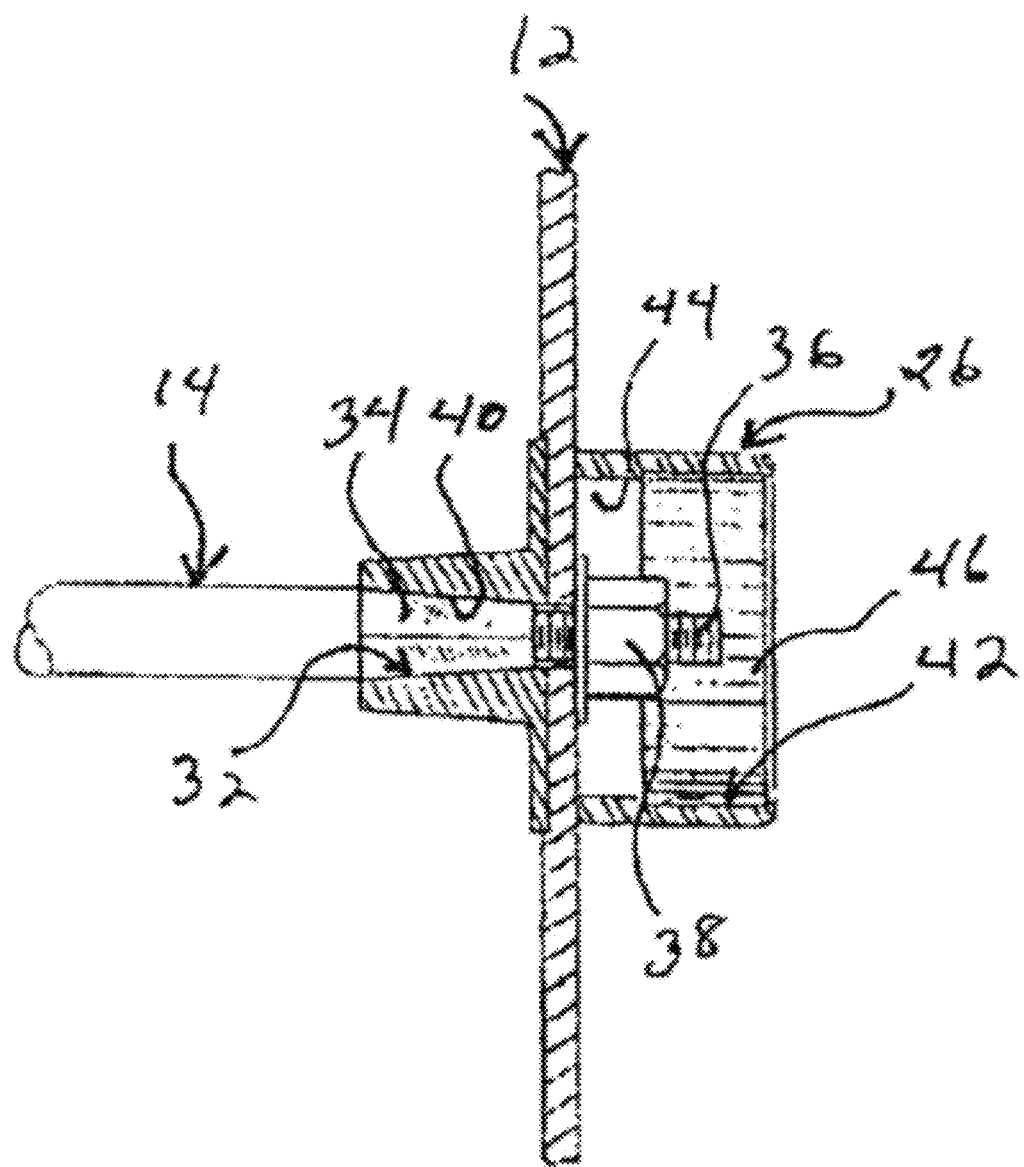
FIG. 4 is a side cross-sectional view illustrating the hand wheel of FIG. 3 along section line IV-IV, wherein the hand wheel is shown attached to an operating shaft of a railcar hand brake assembly.
Figure 5:
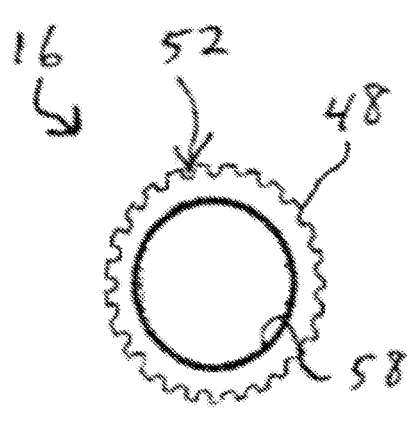
FIG. 5 is a proximal end view illustrating an adaptor, according to an embodiment.
Figure 6:
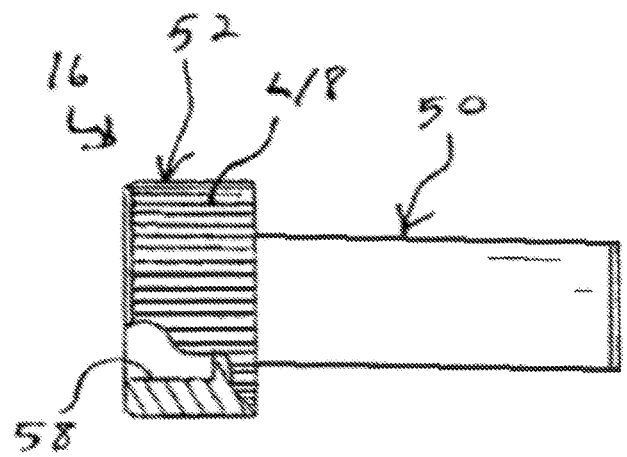
FIG. 6 is a side plan view illustrating the adaptor shown in FIG. 5.
Figure 7:
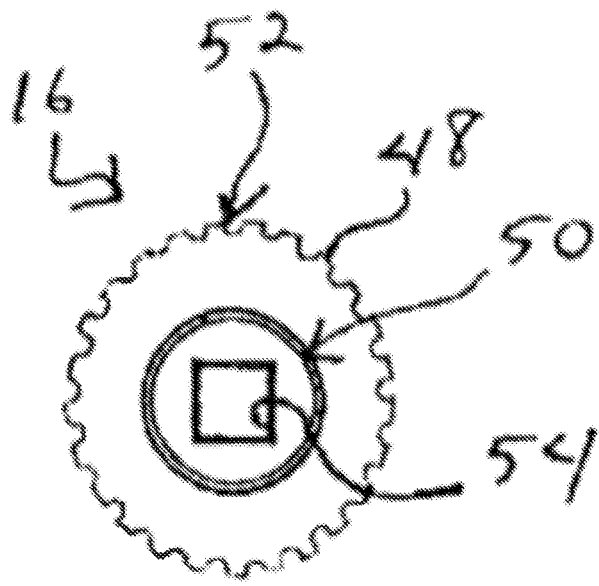
FIG. 7 is a distal end view illustrating the adaptor shown in FIG. 5.

Preferably, for ease of manufacturing of the central hub 26, the socket bore parallel grooves 46 only extend inwardly partially relative to a distal end thereof. For example, as illustrated in FIG. 4, the socket bore parallel grooves 46 may extend between half and ¾ of the longitudinal length of the central hub 26. This partial extension inwardly relative to the distal end of the central hub 26 allows assembling the proximal end of the central hub 26 to a central circular portion of the hand wheel 12 without risking a deformation of a portion of the socket bore parallel grooves 46 proximal thereof.

The socket bore parallel grooves 46 are shaped and sized for freely slidably engaging a corresponding number of compatibly configured and sized socket longitudinal ridges 48 radially distributed about and longitudinally extending relative to a socket adaptor 16 distal end outer cylindrical portion of the socket adaptor 16, which will be described in detail further below.

As would be obvious to someone familiar with the manufacture of hand wheels for operating machinery, the hand wheel 12 in the present invention may be represented by an assembly of sufficiently rigid metal components that are suitably bolted, welded or riveted together, or may be represented by a casted, stamped or otherwise integrally formed hand wheel 12 integrating the characteristics described above. According to the embodiment shown in FIG. 4, the wheel 12 is distinct from the central hub 26 which is itself made of two parts: a front part which comprises the socket engaging bore 42 and the rear part which comprises the hub central bore 32. (Alternatively, the hub central bore 32 is made of more than one piece when assembled, for example one tapered part and another part which is not tapered.) The front part of the central hub 26, the rear part of the central hub 26, and the wheel 12, which can be made of different materials, are held together and attached to the operating shaft 14 by the hand wheel nut 38. As it would be obvious to someone familiar with the art of hand wheel central hubs, an alternate embodiment of the present invention would only include a central hub 26 attachable to a standard hand wheel of a hand brake assembly on a railcar, as described further above, and a socket adaptor 16. The socket adaptor 16 will be described in details hereinafter.

Now referring to FIGS. 1, 5 to 7 and 16 to 21, the socket adaptor 16 has a substantially cylindrical shape defining a socket adaptor first end 50 and a socket adaptor second end 52.

The socket adaptor first end 50 is provided with a standard size square socket bore 54 extending longitudinally inwardly relative to the distal end thereof. The square socket bore 54 is typically sized and configured for engaging the output drive square 56 of the torque multiplicator tool 20.

Preferably, for ease of manipulation of the socket adaptor 16, the socket adaptor first end 50 has a longitudinal length that is substantially equivalent to the width of the hand of an average size adult operator using the torque wrench adaptor system 10.

As indicated further above, the socket adaptor second end 52 defines a socket outer cylindrical portion, or spline, that is compatibly shaped and sized for slidably engaging in a snug fit relation the socket engaging bore 42 at the center of the hand wheel front end 22. More particularly, the cylindrical portion of the socket adaptor second end 52 defines a plurality of socket longitudinal ridges 48 that are corresponding in number, size and configuration relative to the radially distributed and longitudinally extending socket bore parallel grooves 46 of the socket engaging bore 42.

Furthermore, the socket adaptor second end 52 is provided with a socket rounded bore 58 extending longitudinally inwardly relative to the distal end thereof. The socket rounded bore 58 is suitably shaped and sized for freely encompassing the whole outer dimensions of the hand wheel nut 38 threadedly engaged on the operating shaft threaded distal end 36 for securing the hand wheel 12 thereon.

The socket adaptor 16 is preferably made of a substantially rigid metal conventionally used in the manufacture of socket tools.

In some embodiments of a torque wrench adaptor system 10, the compatibly shaped and sized sets of socket bore parallel grooves 46 and socket longitudinal ridges 48 may be unique to a particular pair composed of a central hub 26 and compatible socket adaptor 16 used on a railcar. In other words, for security reasons, a paired hand wheel 12 and central hub 26 with a compatible socket adaptor 16 may be uniquely keyed to one another, thus providing a form of exclusive usage of a socket adaptor 16 on a specific central hub 26 attached to, or integrally formed with, a hand wheel 12 of a railcar hand brake assembly.

Furthermore, in some embodiments, such keyed pair hand wheel 12 and central hub 26 with a compatible socket adaptor 16 may be further provided with indicia, inscriptions or markings that are stamped, engraved or otherwise written along surface portions thereof for indicating, for example, a specific torque value setting to be applied on the brake assembly of the associated railcar. Thus, such keyed pair central hub 26 and socket adaptor 16, in combination with the torque value setting indicated thereon provide an improved safety measure for reducing human error when having to apply a specific torque value to specific railcars.

Figure 17:
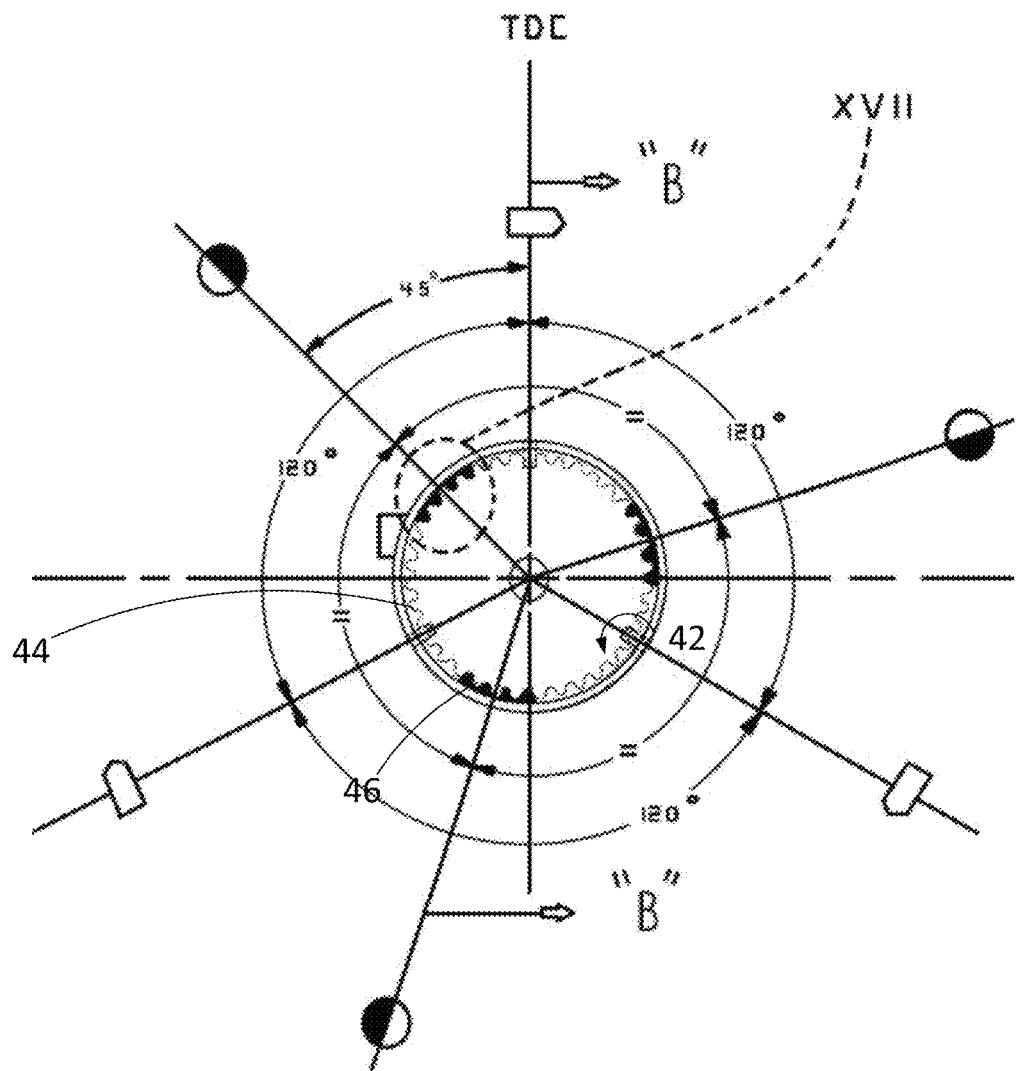
FIG. 17 is a view illustrating the hand wheel central hub of FIG. 16.
Figure 20:
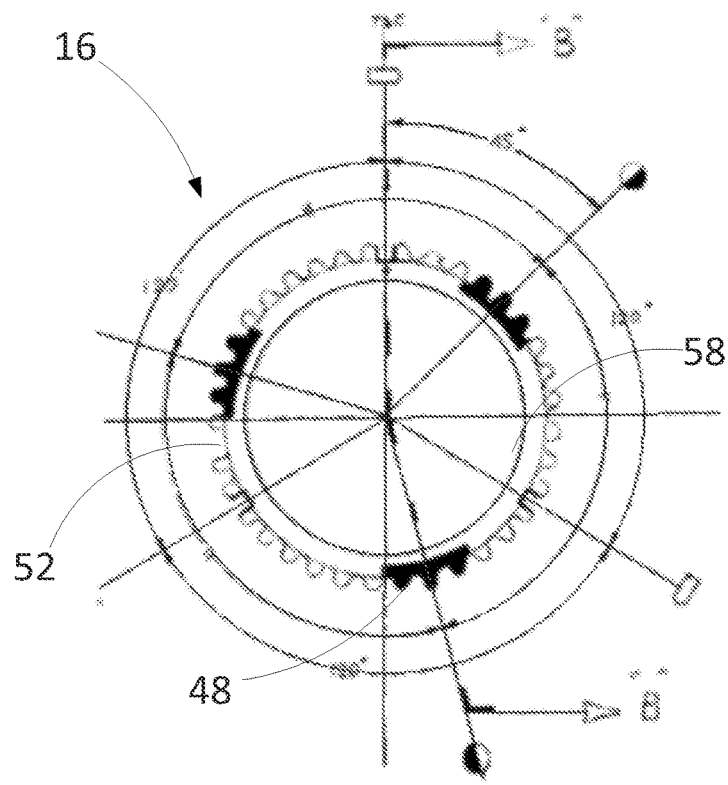
FIGS. 20 and 21 are views illustrating a socket bore of the socket adaptor of FIGS. 18 and 19.
Figure 21:
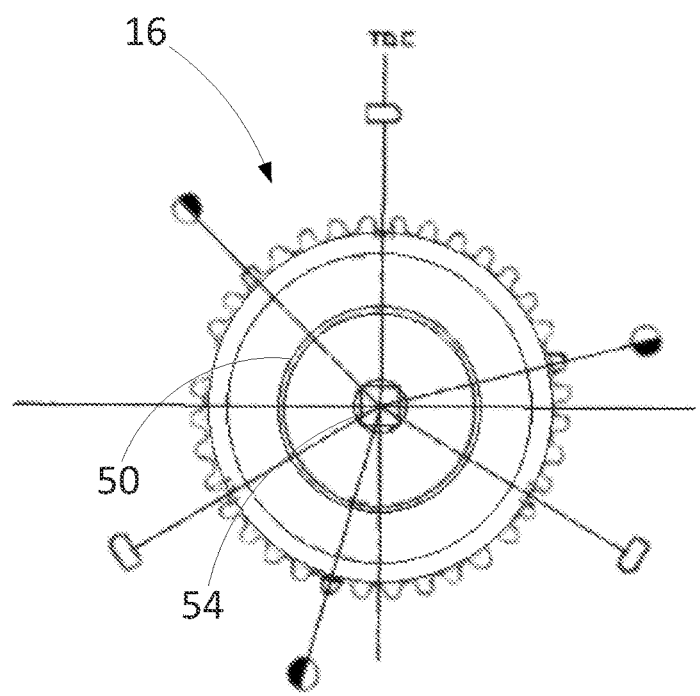
Figure 22:
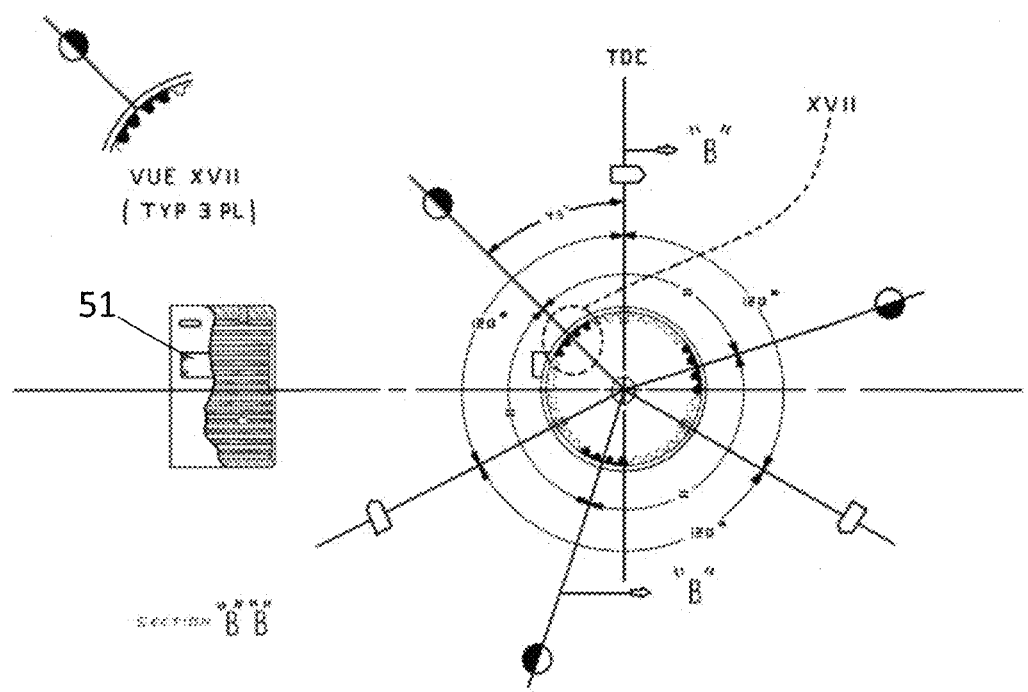
FIGS. 22 and 23 are combined section views illustrating the hand wheel central hub of FIGS. 16 and 17.

Furthermore, grooves 46 can be of varying shape and depth in order to provide angle determination capabilities, as shown in FIG. 17. For example, there is shown a flat groove at the middle groove of the dark sections shown in the figure. Ridges 48, as shown in FIG. 20, are adapted to engage with such grooves 46.

Figure 16:
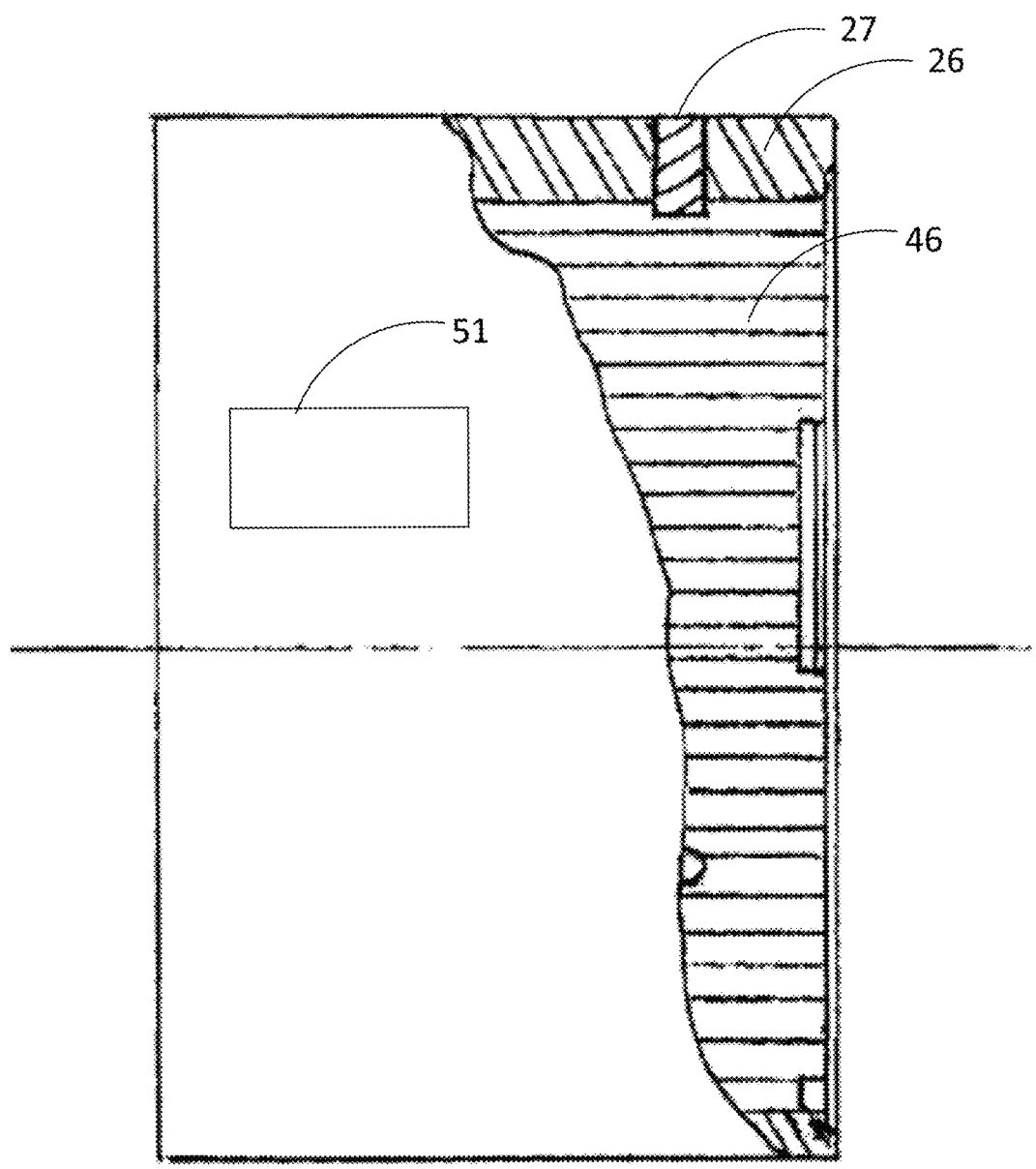
FIG. 16 is a side section view illustrating the hand wheel central hub, according to an embodiment.

Moreover, as shown in FIG. 16, a stopper 27 can be provided for use as a safety key.

Figure 18:
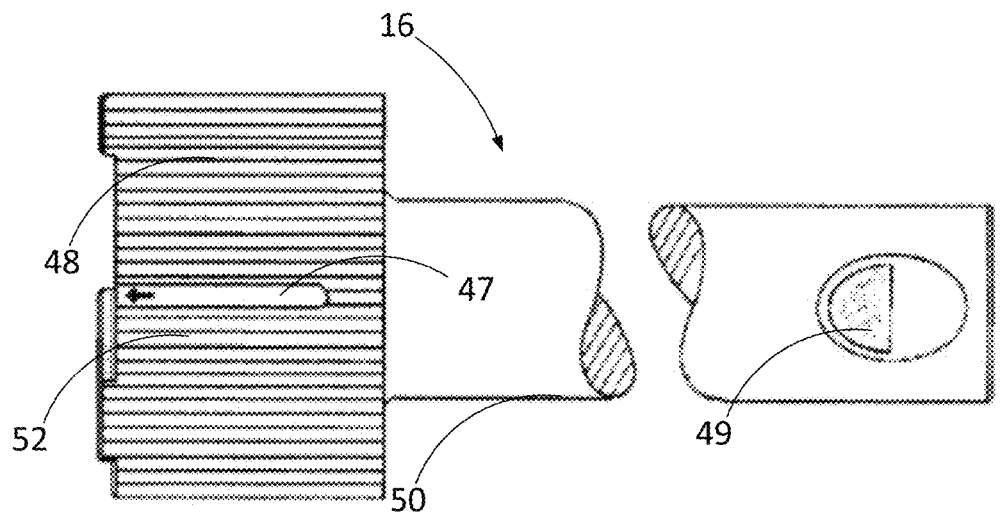
FIGS. 18 and 19 are a side plan views illustrating a socket adaptor, according to an embodiment.
Figure 19:
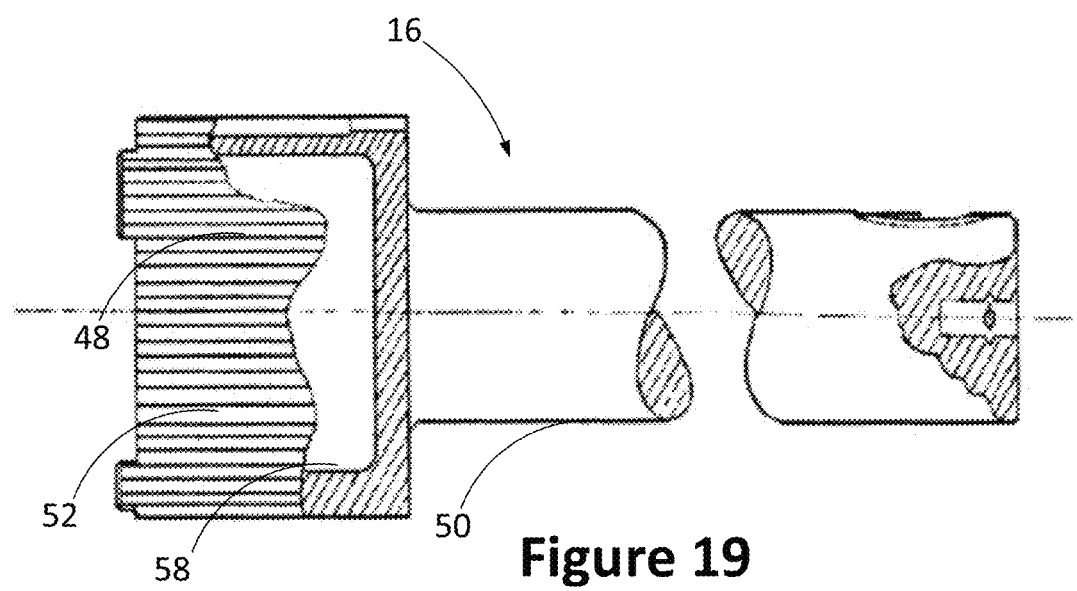

Additionally, a manual lock 49 is provided on an embodiment of the socket adaptor, as shown on FIG. 18. Preferably, in some regions of the world, the socket adaptor is large enough to be used with gloves or mittens during cold weather.

A method of using the torque wrench adaptor system 10 will now be described.

In a first step, with the hand wheel 12 fixedly attached at the distal end of the operating shaft 14 of the manual brake assembly of a railcar, an operator engages the socket adaptor second end 52 in the socket engaging bore 42 of the hand wheel 12.

In a second step, the operator engages the output drive square 56 of the torque multiplicator tool 20 into the standard square socket bore 54 at the distal end of the socket adaptor first end 50, followed with engaging the output drive square 60 of the ratchet tool 18 into the input square bore 62 of the torque multiplicator tool 20.

In a third step, while holding the handle, or reaction arm 64, of the torque multiplicator tool 20 with one hand, the operator can progressively ratchet the handle of the ratchet tool 18 until the specified torque is reached.

For example, an indication that the specified torque value is reached may be typically signaled to the operator applying the hand brakes by a distinctive 'click' (or light signal, or another sound signal) generated by the torque limiting mechanism of the torque multiplicator tool 20, at which point, no more torque force may be applied on the socket adaptor 16. With some other brands of a torque multiplicator tool 20, as described further above, an indication that the specified torque value is reached may be signaled to the operator applying the hand brakes by a suitable graduated scale on the head of the tool. The torque that needs to be applied may be determined by safety standards or rules.

Thus, an operator may conveniently apply the manual brakes on a railcar at precisely the appropriate torque value on the hand wheel 12 without the risk of altering the tightening of the hand wheel nut 38 securing the latter on the threaded distal end 36 of the operating shaft 14.

Furthermore, by using the torque wrench adaptor system 10 of the present invention, a predetermined constant torque value is reliably applied every time on a hand brake assembly of a railcar, independently if it is applied by a progressively tired operator applying the manual brakes on a long series of railcars, or that it is applied by different operators. Typically, a maximum torque value applied on a hand brake system may be set, for example, between 150 and 200 foot-pounds in some models of railcars. Other maximum torque values are also possible depending on the requirements of the law or of various standards.

As it would be obvious to someone familiar with the art of socket adaptors removably engageable with a compatibly configured central hub 26 of a wheel, a hand wheel 12, or other equivalently rotatable equipment, in some alternate embodiments (not shown in the drawings) that are substantially similar to the above described embodiments, the socket engaging bore 42 and compatibly shaped socket adaptor second end 52 configuration may be inverted. More particularly, the central hub 26 may be provided with socket bore 54 parallel splines or grooves 46 radially distributed and extending longitudinally along the outer surface thereof, instead of along the cylindrically shaped socket bore inner surface 44. Correspondingly, socket adaptor second end 52 may define a socket rounded bore 58 having sufficiently sized diameter and depth for engaging the outer diameter of the central hub 26. Furthermore, the cylindrically shaped inner surface of the socket rounded bore 58 may be provided with compatibly shaped and radially inwardly projecting socket longitudinal ridges 48 for engaging, in a snug fit relation, the thus radially outwardly projecting socket bore parallel splines or grooves 46 that are longitudinally extending along the outer surface of the central hub 26.

Figure 8:
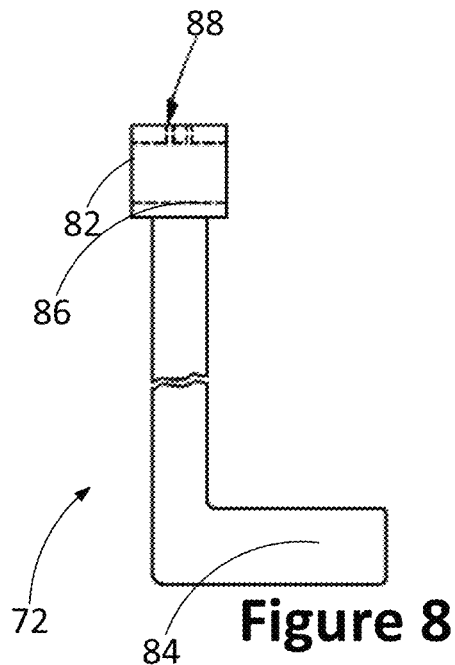
FIG. 8 is a side plan view illustrating a torque multiplicator extension member, according to an embodiment.
Figure 9:
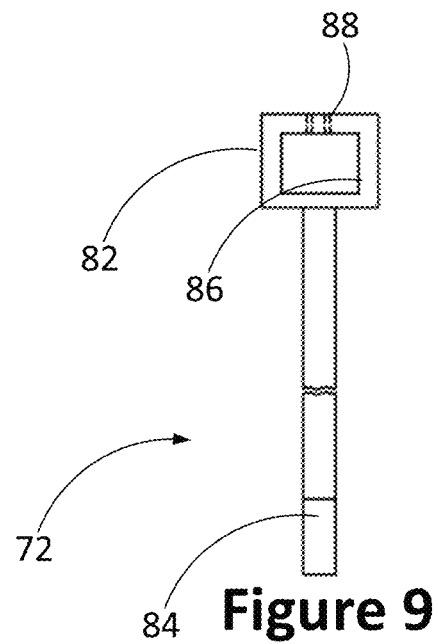
FIG. 9 is a rear plan view illustrating the torque multiplicator extension member of FIG. 8.
Figure 10:
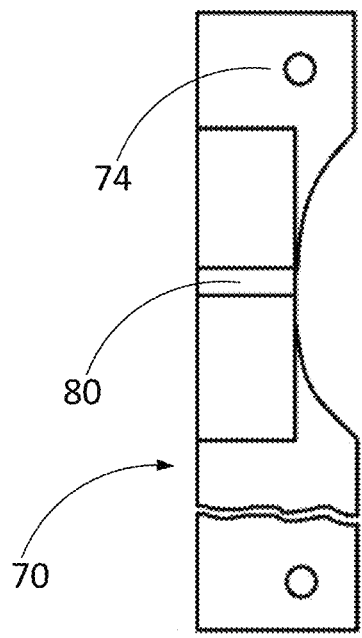
FIG. 10 in a front plan view illustrating a torque multiplicator abutment member, according to an embodiment.
Figure 11:
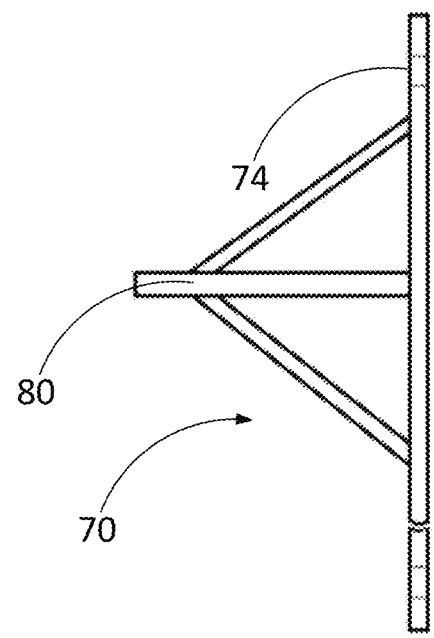
FIG. 11 is a side plan view illustrates the torque multiplicator abutment member of FIG. 10.

FIGS. 8 to 14 inclusively illustrate various aspects of an alternate embodiment of a torque wrench adaptor system 100 according to the present invention. The torque wrench adaptor system 100 is substantially similar to the previously described embodiment 10 with the exception that it further includes a torque multiplicator abutment member 70, as illustrated in FIGS. 10 and 11, and a torque multiplicator extension member 72, as illustrated in FIGS. 8 and 9 respectively.

The torque multiplicator abutment member 70 includes an abutment member base portion 74 defining a distal rear end surface abuttingly attachable to a railcar wall surface portion 76 that is substantially proximal the operating shaft 14 using typically a plurality of screw and nut combinations 78, or any other suitable attachment means such as a welding process.

The torque multiplicator abutment member 70 further includes an abutment member prong portion 80 extending from the abutment member base portion 74 at an attitude that is substantially perpendicularly distally relative to the railcar wall surface portion 76.

Figure 12A:
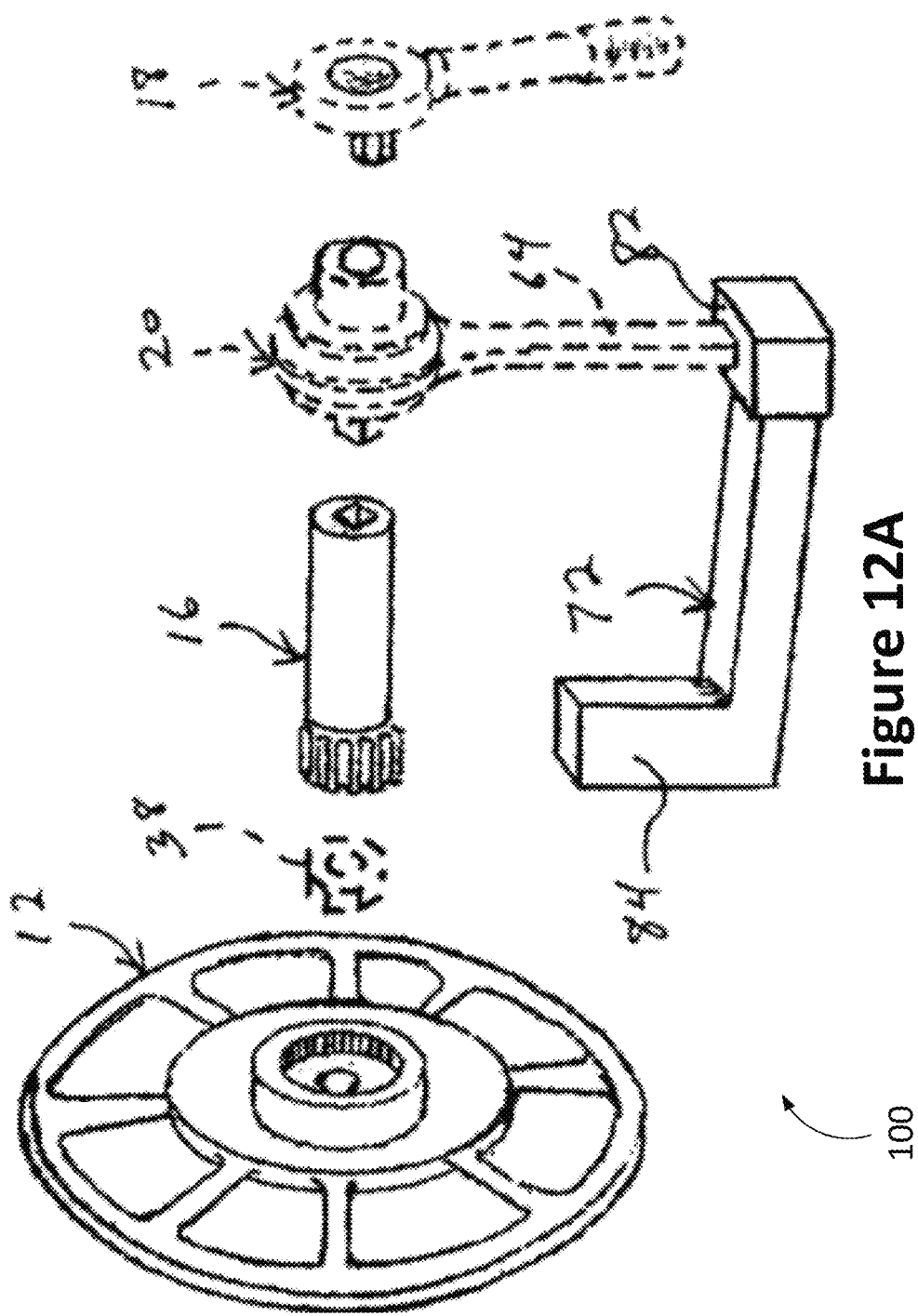
FIGS. 12A and 12B are environmental, perspective exploded views illustrating an alternate embodiment of a torque wrench adaptor system for a railcar hand brake assembly.
Figure 12B:
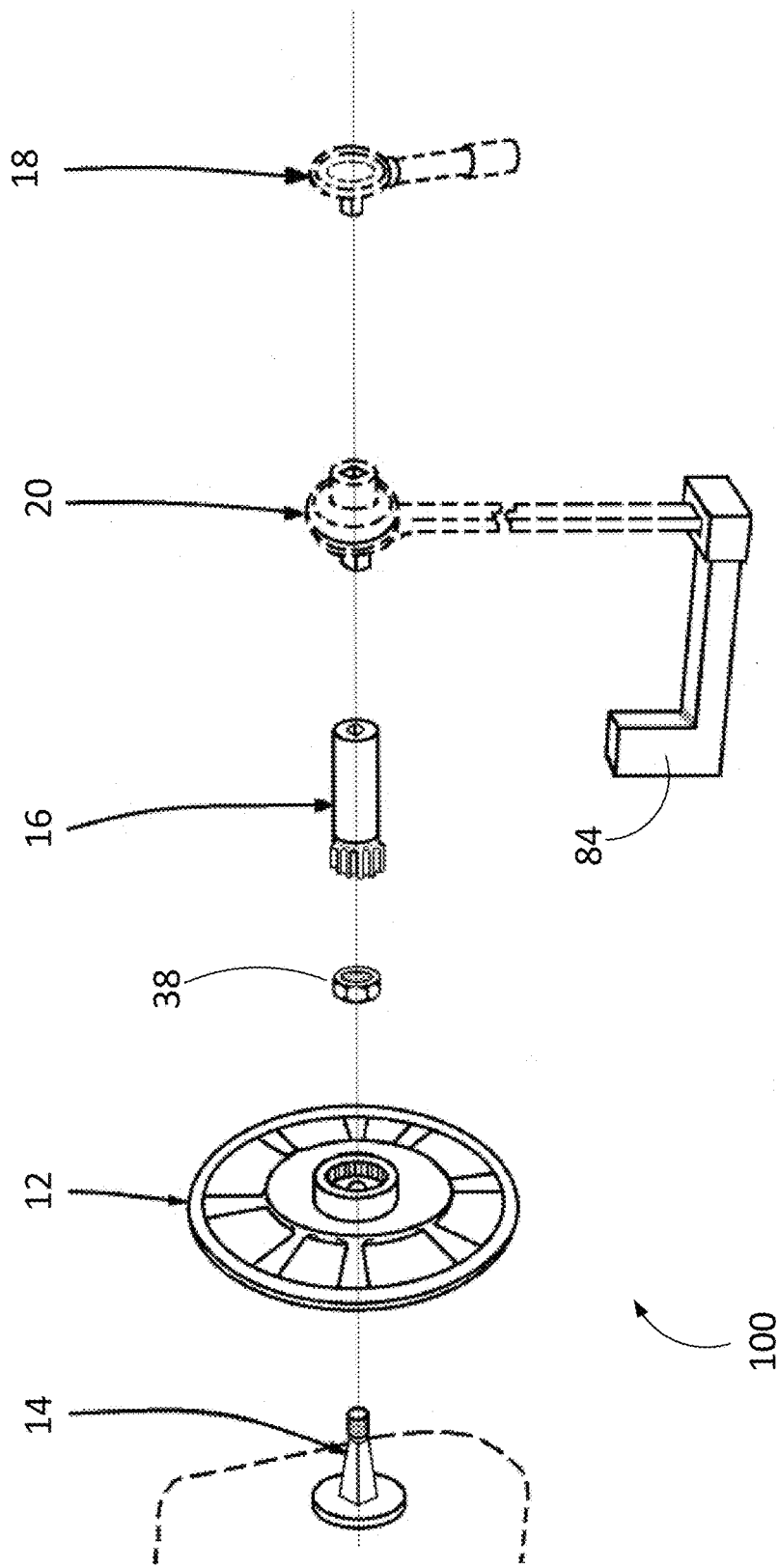
Figure 14:
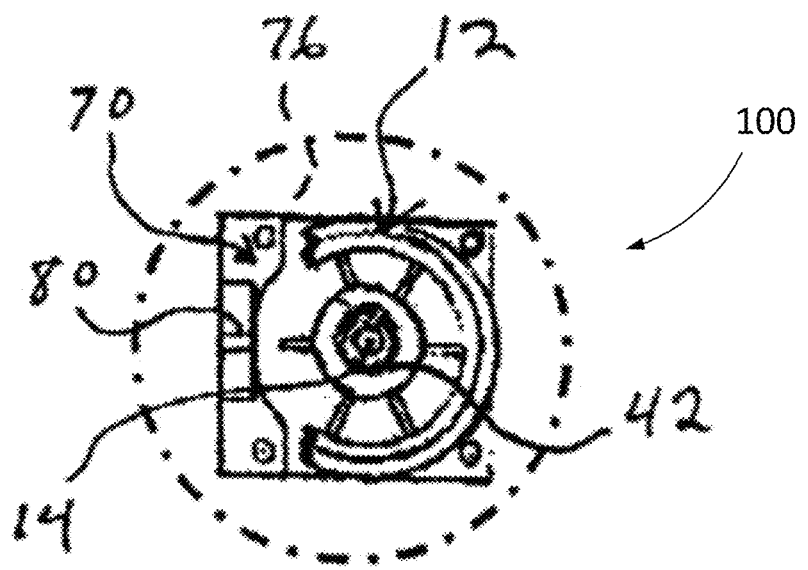
FIG. 14 is an enlarged view illustrating the torque multiplicator abutment member shown within section line XIV in FIG. 13, according to an embodiment.
Figure 15:
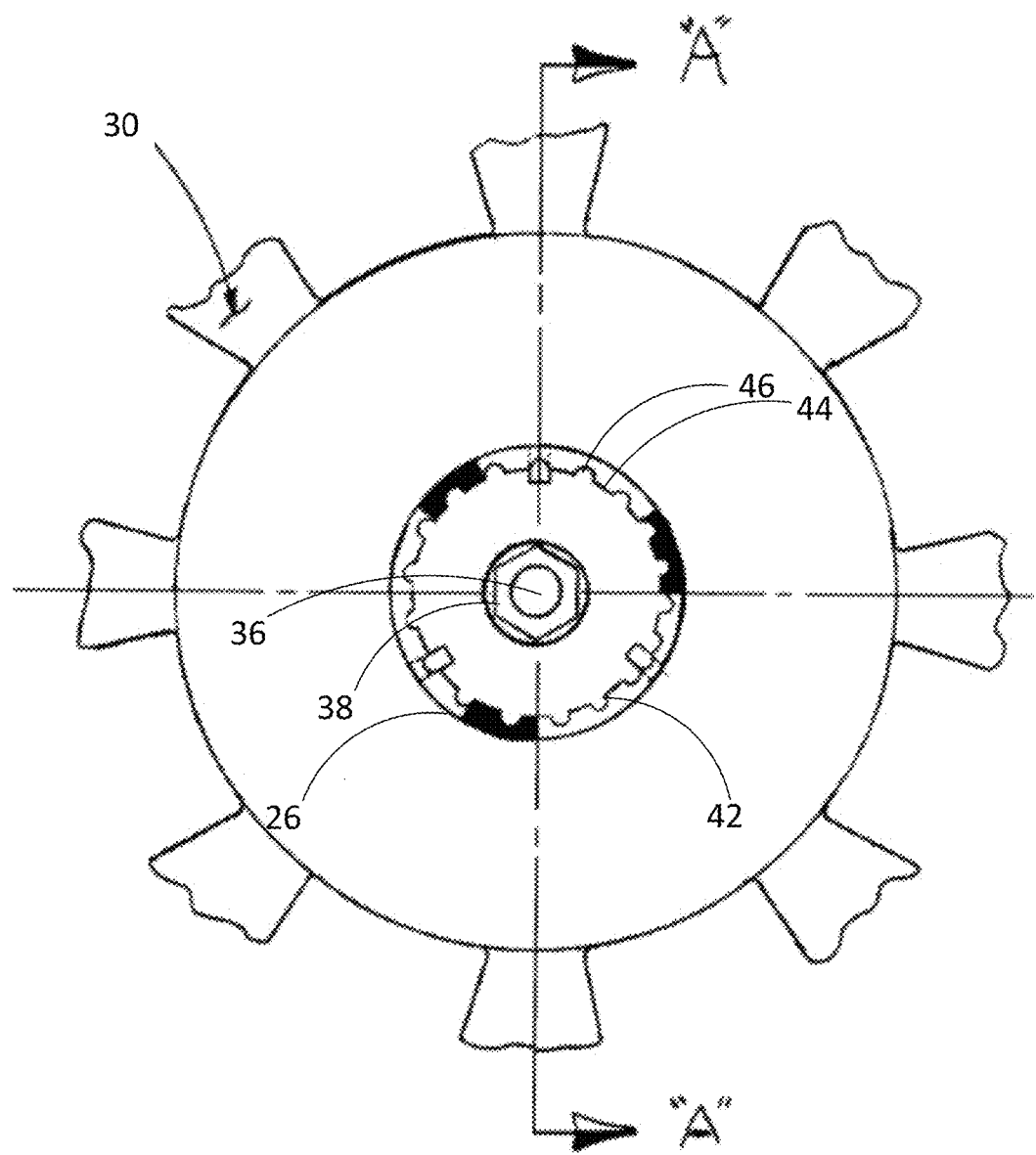
FIG. 15 is a partial front view illustrating a hand wheel attachable to a railcar hand brake assembly, according to an embodiment.

Preferably, the abutment member prong portion 80 extends therefrom at a length that allows the torque multiplicator abutment member 70 to be attached on the railcar wall at a position thereon that is substantially behind the hand wheel 12, as best illustrated in FIGS. 12A, 12B and 14.

As exemplified in the drawings, the torque multiplicator abutment member 70 may be represented by an assembly of substantially rigid metal components comprising a plate and flat bars that are suitably welded, bolted or otherwise attached together.

The torque multiplicator extension member 72 has preferably a substantially L-shaped configuration terminated at a first end thereof with a relatively short handle engaging socket member 82 and at a second end thereof with an extension member abutment portion 84. The handle engaging socket member 82 defines a handle engaging socket member bore 86 extending through the distal end of the L-shaped member along an axis that is substantially parallel to the extension member abutment portion 84. Furthermore, the handle engaging socket member 82 is suitably shaped and sized for slidably engaging, in a snug fit relation, a distal end portion of the elongated handle, also called the reaction arm 64, of the torque multiplicator tool 20, and is preferably provided with a set screw and threaded bore combination 88 extending transversally through a side edge thereof for selectively locking therein the handle portion of the tool.

The torque multiplicator extension member 72 is suitably sized and shaped such that, with the handle engaging socket member 82 engaged on the handle of the torque multiplicator tool 20, at least a distal end side portion of the extension member abutment portion 84 with a distal end side portion of the abutment member prong portion 80.

Thus, as can be deducted from FIGS. 12A and 12B, the torque multiplicator abutment member 70, in cooperative relation with the torque multiplicator extension member 72, provides a convenient means for selectively retaining the elongated handle of the torque multiplicator tool 20 at a fixed angle while the ratchet tool 18 is used to apply a specified rotational torque force on the hand wheel 12 of the railcar hand brake assembly.

FIGS. 22 to 26 are illustrations which combine sections views of preceding figures together to better reflect the configuration of some parts of the torque wrench adaptor system 10.

Figure 23:
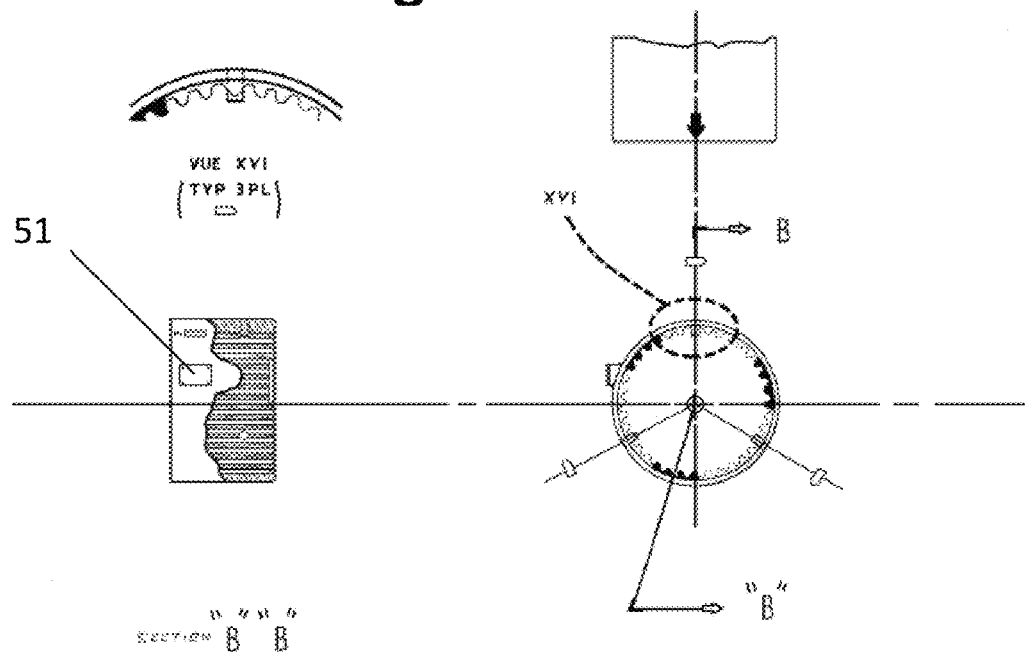
Figure 24:
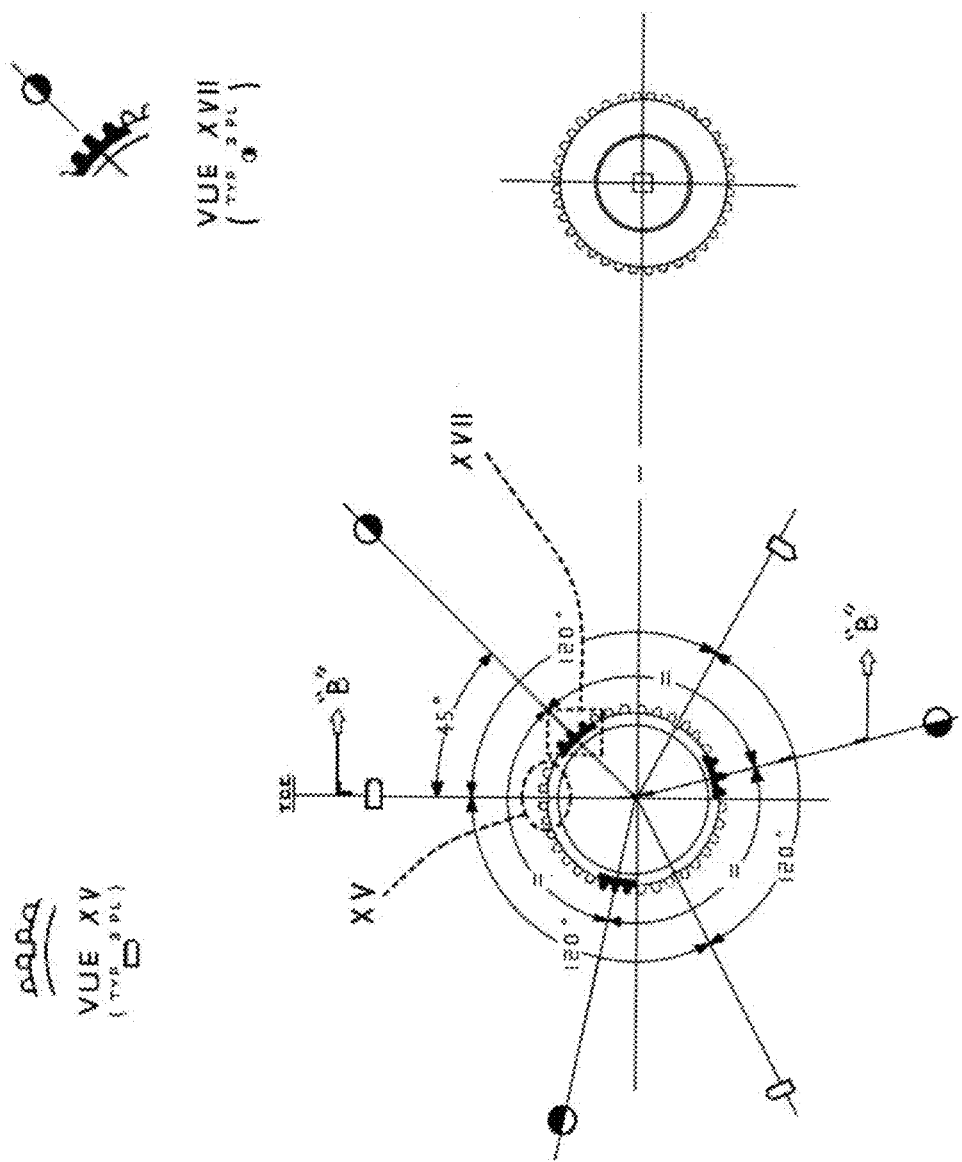
FIG. 24 is a combined section view illustrating the socket bore of the socket adaptor of FIGS. 20 and 21.
Figure 25:
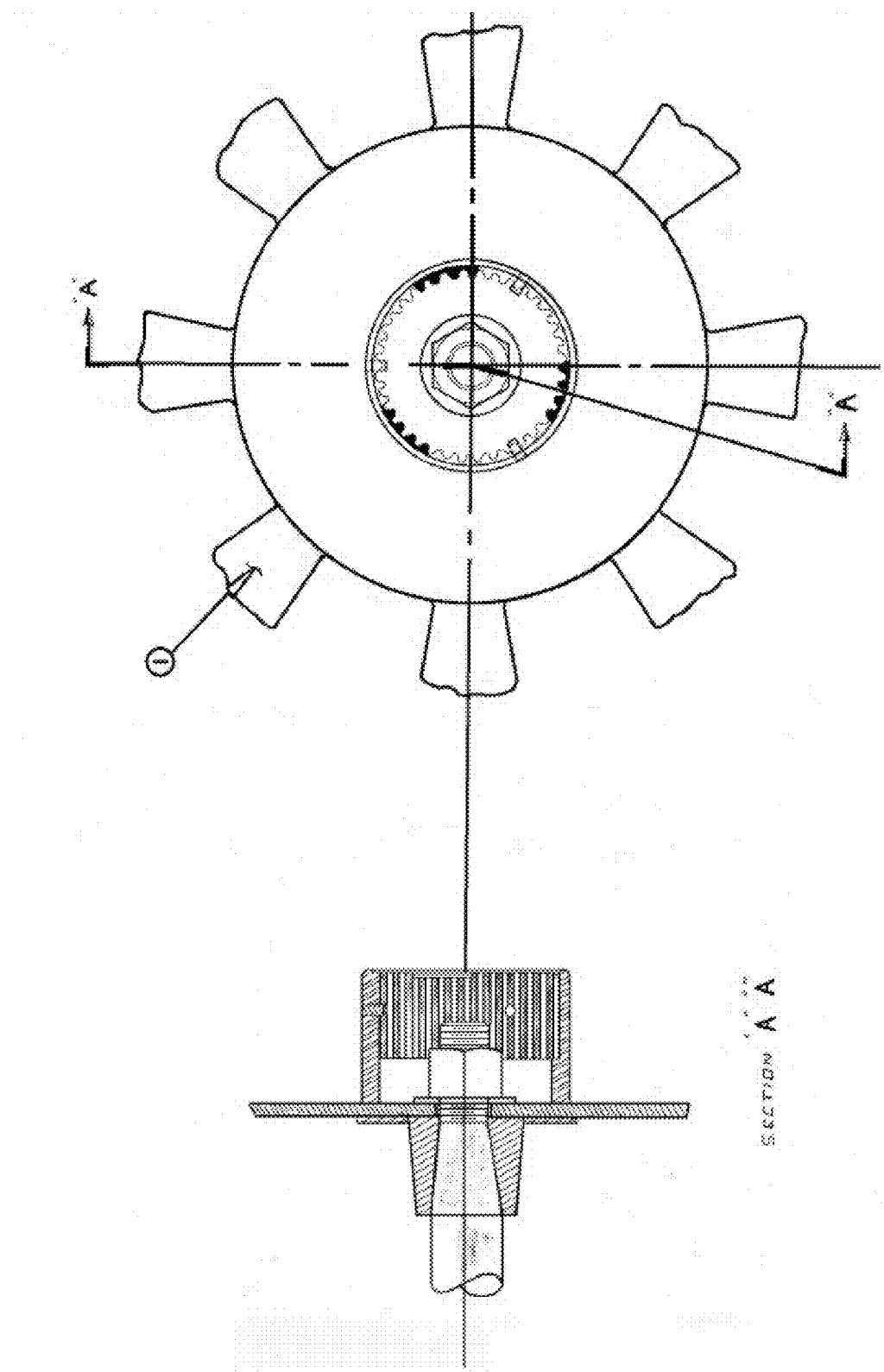
FIG. 25 is a combined section view illustrating the hand wheel of FIGS. 3 and 4.
Figure 26:
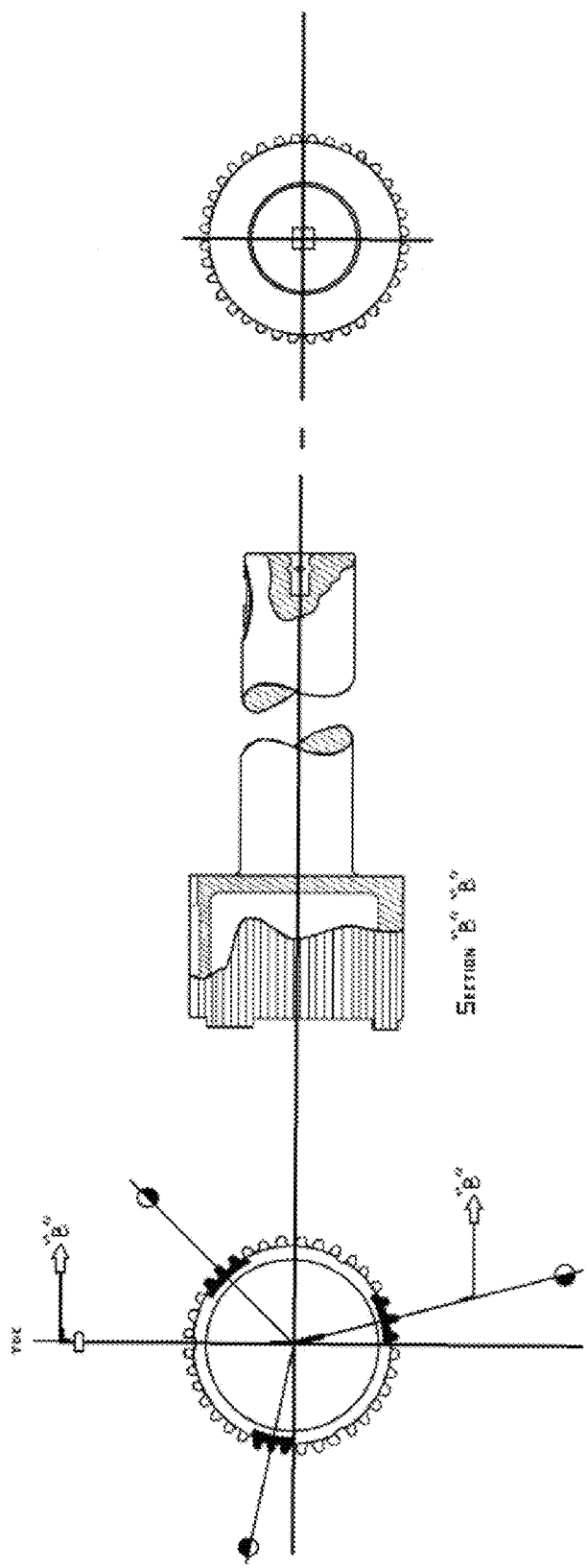
FIG. 26 is a combined section view illustrating the socket adaptor.

More specifically, FIG. 23 shows the hand wheel central hub 26 according to an embodiment in which the central hub 26 is adapted to receive a SIM card for identification and communication purposes. A stamp of the SIM card identification can also be provided on the central hub 26. The SIM card allows the sending of data relative to the state of the system 10. For example, if one out of three wagons need to be locked according to a given legislation, the SIM card provided on each system allows the operator to know rapidly which wagons are locked and which are not. A SIM card housing 51 is shown in FIG. 16.

FIG. 23 further shows an alignment arrow engraved on the central hub for alignment, according to an embodiment. This arrow is to be used in combination with the arrow 47 shown on FIG. 18.

Figure 27:
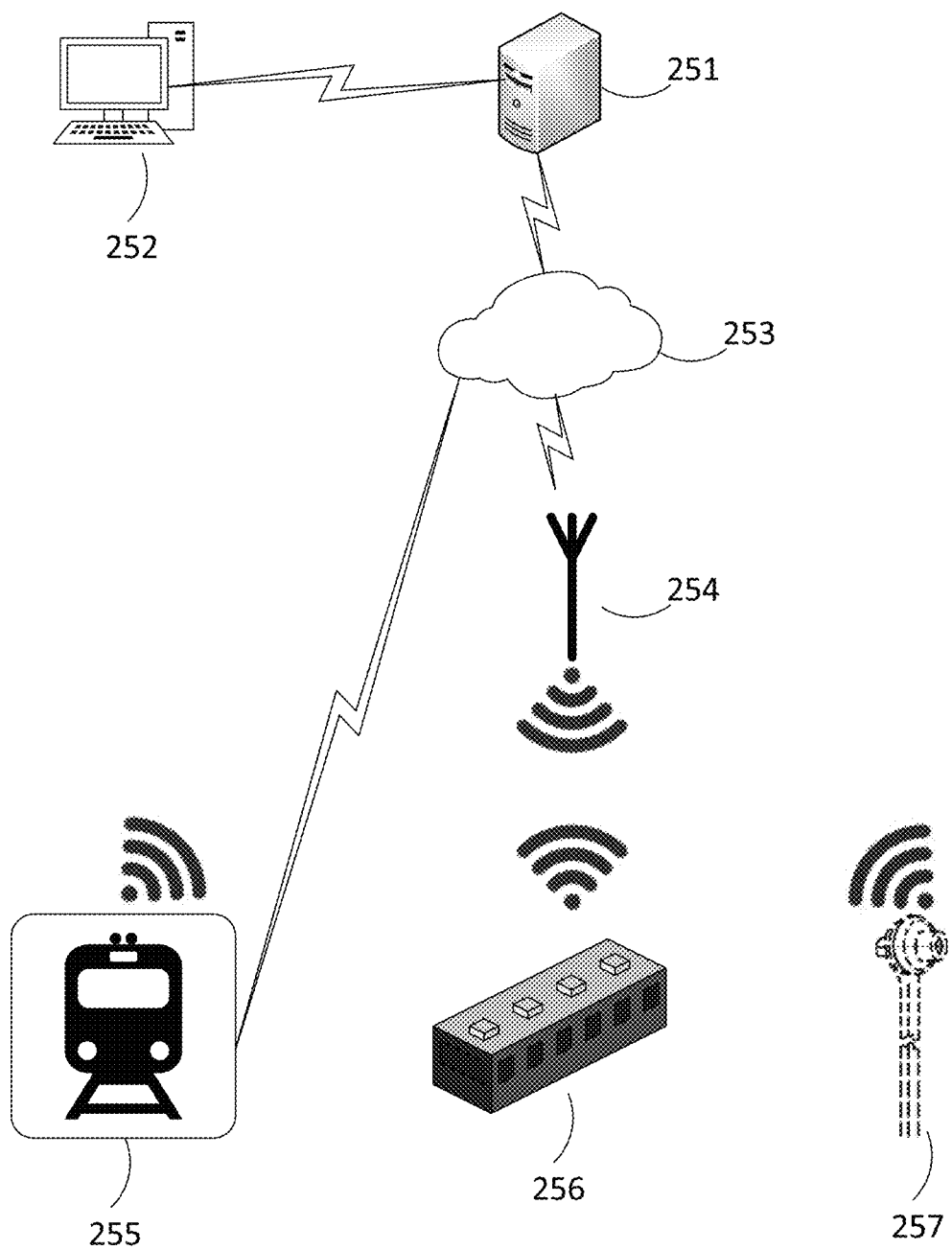
FIG. 27 is a diagram illustrating a platform for communicating information about the state of the hand brake of a plurality of wagons, according to an embodiment.

The embodiment of FIG. 23 in which a SIM card is provided can be used within a context as shown in FIG. 27, wherein a communication platform for wagons is described. The information, such as identification of the SIM card or the state of the hand brake, can be sent to an antenna 254 (preferably wirelessly) at a wagon 256 or to a torque multiplicator held by the operator 257. The torque multiplicator comprises a sensor to gather data and a communication module to send the data to a control center. The data can then be transmitted through the internet or another communication network 253 to a server which analyses the data. A control center 252 may supervise the process. The state of all wagons (whether they are blocked, what torque is being applied) is therefore known to the users of the platform. The information can then be sent to a computer in the locomotive 255. The information can also be used to activate either lights or sound signals indicating that a particular is being applied. The platform can also be reprogrammed to ensure that updated standards are still complied with.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A torque wrench adaptor system for applying a torque value to an operating shaft of a manual brake of a railcar, the torque wrench adaptor system comprising:
   a central hub for a hand wheel, the central hub attachable to the operating shaft via the central hub; and
   a socket adaptor removably engageable in the central hub, and adapted for engagement with a ratchet tool;
   wherein the ratchet tool is for applying torque which is transmitted to the operating shaft via the socket adaptor and central hub until the torque value is reached and applied to the operating shaft,
   wherein the socket adaptor comprises a first end and a bore at the first end, the bore adapted for engagement with an output drive of a torque multiplicator tool which in turn is adapted for engagement to the ratchet tool; and
   wherein the torque wrench adaptor system further comprises a torque multiplicator abutment member for attachment on the railcar proximal a circumference of the hand wheel and a torque multiplicator extension member for abutting on the torque multiplicator abutment member when the torque is applied to the ratchet tool thereby selectively retaining an elongated handle of the torque multiplicator tool at a fixed angle while the ratchet tool is used to apply the torque value.

2. The torque wrench adaptor system of claim 1, wherein the socket adaptor comprises a second end, the second end being distal the first end, and a cylindrical portion at the second end, and further wherein the central hub comprises a central hub which defines a socket engaging bore extending axially relative to the central hub and which defines a substantially cylindrically shaped socket bore inner surface adapted for engagement with the cylindrical portion of the socket adaptor.

3. The torque wrench adaptor system of claim 2, wherein the substantially cylindrically shaped socket bore inner surface is provided with socket bore parallel grooves extending thereon longitudinally.

4. The torque wrench adaptor system of claim 3, wherein the cylindrical portion at the second end of the socket defines a plurality of socket longitudinal ridges that are for corresponding engagement with the socket bore parallel grooves of the socket engaging bore.

5. The torque wrench adaptor system of claim 2, wherein the socket adaptor has a substantially cylindrical shape defining the first end and the second end.

6. The torque wrench adaptor system of claim 5, wherein the first end is provided with a square socket bore extending longitudinally toward the second end, the square socket bore being for engaging therein an output drive square of the torque multiplicator tool.

7. The torque wrench adaptor system of claim 5, wherein the second end defines a socket outer cylindrical portion for slidably engaging in the socket engaging bore of the central hub.

8. The torque wrench adaptor system of claim 5, wherein the second end is provided with a socket rounded bore extending longitudinally toward the first end.

9. The torque wrench adaptor system of claim 8, wherein the central hub is secured on the operating shaft by a hand wheel nut engaged on a threaded distal end of the operating shaft, the socket rounded bore being large enough for wholly encompassing the hand wheel nut thereby avoiding altering the tightening of the hand wheel nut securing the central hub on the operating shaft thereof.

10. The torque wrench adaptor system of claim 1, wherein the torque multiplicator abutment member provides an abutment member prong portion extending substantially perpendicularly from the railcar.

11. The torque wrench adaptor system of claim 1, wherein the torque multiplicator extension member has a substantially L-shaped configuration.

12. The torque wrench adaptor system of claim 11, wherein the torque multiplicator extension member has a distal end provided with a handle engaging socket member for removable attachment with the torque multiplicator tool.

13. The torque wrench adaptor system of claim 1, wherein the central hub and the socket adaptor are made of a substantially rigid metal.

\* \* \* \* \*